United States Patent
Mittal et al.

(10) Patent No.: US 6,662,154 B2
(45) Date of Patent: Dec. 9, 2003

(54) METHOD AND SYSTEM FOR INFORMATION SIGNAL CODING USING COMBINATORIAL AND HUFFMAN CODES

(75) Inventors: Udar Mittal, Hoffman Estates, IL (US); Edgardo Manuel Cruz-Zeno, Round Lake, IL (US); James Patrick Ashley, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 14 days.

(21) Appl. No.: 10/015,871

(22) Filed: Dec. 12, 2001

(65) Prior Publication Data

US 2003/0110027 A1 Jun. 12, 2003

(51) Int. Cl.[7] .................. G10L 19/10; G10L 21/04; H03D 3/24; H03K 5/19
(52) U.S. Cl. ............... 704/219; 704/503; 375/341; 327/18
(58) Field of Search ................ 704/219, 211, 704/222, 220, 503; 386/39; 375/341; 327/18

(56) References Cited

U.S. PATENT DOCUMENTS

| | | | | |
|---|---|---|---|---|
| 4,479,150 A | * | 10/1984 | Ilmer et al. | 386/39 |
| 4,944,013 A | * | 7/1990 | Gouvianakis et al. | 704/219 |
| 5,136,663 A | * | 8/1992 | Nishio | 704/222 |
| 5,265,167 A | * | 11/1993 | Akamine et al. | 704/220 |
| 5,826,225 A | * | 10/1998 | Hartung et al. | 704/222 |
| 6,041,298 A | * | 3/2000 | Gortz | 704/223 |
| 6,141,638 A | | 10/2000 | Peng et al. | |
| 6,236,960 B1 | * | 5/2001 | Peng et al. | 704/211 |
| 6,311,154 B1 | * | 10/2001 | Gersho et al. | 704/219 |

FOREIGN PATENT DOCUMENTS

EP        000710929 A2 *  8/1996

OTHER PUBLICATIONS

Kroon et al ("Regular–Pulse Excitation—A Novel Approach to Effective And Efficient Multipulse Coding Of Speech" IEEE Transactions on Acoustics, Speech, and Signal Processing Page(s): 1054–1063, Oct. 1986).*

James P. Ashley, Edgardo M. Cruz–Zeno, Udar Mittal, and Weimin Peng; "Wideband Coding of Speech Using a Scalable Pulse Codebook"; IEEE Workshop on Speech Coding Proceedings, Sep. 17–20, 2000, Delavan, WI 148–150.

* cited by examiner

*Primary Examiner*—Vijay Chawan
*Assistant Examiner*—Daniel A. Nolan
(74) *Attorney, Agent, or Firm*—Kenneth A. Haas

(57) ABSTRACT

The invention provides a method of coding an information signal. An information signal is represented by a sequence of pulses. A plurality of pulse parameters are determined based on the sequence of pulses including a non-zero pulse parameter corresponding to a number of non-zero pulse positions in the sequence of pulses. The non-zero pulse parameter is coded using a variable-length codeword.

29 Claims, 5 Drawing Sheets

400

METHOD AND SYSTEM FOR INFORMATION SIGNAL CODING USING COMBINATORIAL AND HUFFMAN CODES

FIELD OF THE INVENTION

This invention generally relates to encoding and decoding an information signal. In particular, the invention relates to a method for information signal encoding and decoding using variable-length combinatorial and Huffman codes.

BACKGROUND OF THE INVENTION

Methods for coding an information signal form the basis for a significant amount of speech, audio, image and video transmissions through communication channels or from storage devices. Digital speech encoding standards for code division multiple access (CDMA) mobile phone systems, for example, are described in the approved specification (ANSI/TIA/EIA-95-B-1999) entitled "Mobile Station—Base Station Compatibility Standard for Wideband Spread Spectrum Cellular Systems" (1999), published by the Electronic Industries Association (EIA), 2500 Wilson Blvd., Arlington, Va., 22201. A variable rate speech codec, and specifically a Code Excited Linear Prediction (CELP) codec for use in communication systems compatible with IS-95, is defined in the document (TIA/EIA/IS-127) entitled "Enhanced Variable Rate Codec, Speech Service Option 3 for Wideband Spread Spectrum Digital Systems" (1997), published by the Electronics Industries Association (EIA), 2500 Wilson Blvd., Arlington, Va., 22201.

A method for encoding a speech signal using factorial packing (FP) is described in "Factorial Packing Method and Apparatus for Information Coding", U.S. Pat. No. 6,236,960 by Peng et al., issued May 22, 2001. This speech coder utilizes four characteristics to uniquely describe any given pulse combination: number of degenerate pulses, signs of pulses, positions of non-zero pulses, and pulse magnitudes. A four-stage iterative classification of the pulse combination is performed, starting with the number of non-zero pulses and then determining the remaining parameters. The most significant bits in FP have most of the information about the number of non-zero pulses, while the least significant bits have primarily sign information showing a partial segregation of constituent information in FP. There is no complete segregation in this method, and therefore an error in the central bits does not always ensure that the number of degenerate pulses can be decoded correctly. Factorial packing is an example of an enumeration method, where indices are assigned to the pulse configurations. The codeword that is generated with this method, however, has no well-defined bit fields that represent the pulse characteristics.

The pyramid vector quantization (PVQ) method, as described by Fischer, "A Pyramid Vector Quantizer", IEEE Transactions on Information Theory, Vol. IT-32, July 1986, pp. 568–583, is another example of an enumeration method. The enumeration technique may be very sensitive to bit errors. Hung et al., in the article "Error-Resilient Pyramid Vector Quantization for Image Compression", IEEE Transactions on Image Processing, Vol. 7, October 1998, pp. 1373–1386, proposed some PVQ enumeration methods that are less sensitive to bit errors than those proposed by Fischer. Two of their proposed enumeration methods, Conditional Product Code (CPC) and Conditional Product-Product Code (CPPC), were found to be robust to bit errors when used for representing Discrete Cosine Transform (DCT) coefficients in image compression. FP may be considered a variant of CPC. FP and CPC achieve robust performance by "partial segregation" of information present in a pulse configuration. The CPPC method has more segregation of constituent information, although it also does not ensure complete segregation. The comparisons between CPPC and CPC indicate that the CPPC method may be more robust to bit errors, suggesting that increasing information segregation may increase robustness. With complete information segregation, none of the bits in the codeword is affected by more than one of the constituents. It would be preferred that addition and multiplication functions would not be used to combine constituent codewords into a complete codeword, as these operations may add to the complexity of the coding process, and also tend to decrease segregation. The codeword should be formed by a concatenation of the constituent codewords, thus maintaining complete information segregation for higher error resilience.

A method for coding an information signal based on parameters inherent to the information signal is described in "Method and Apparatus for Coding an Information Signal", U.S. Pat. No. 6,141,638, W. Peng and J. Ashley, issued Oct. 31, 2000. The method selects one of a plurality of configurations based on predetermined parameters related to the information signal, each of the plurality of configurations having a codebook; and searches the codebook over the length of an excitation vector which is shorter than a sub-frame length, to determine a codebook index from the codebook corresponding to the selected configuration; and transmits the predetermined parameters and the codebook index to a destination.

A code-excited linear prediction (CELP) technique is described in the paper by James P. Ashley, Edgardo M. Cruz-Zeno, Udar Mittal and Weimen Peng, "Wideband Coding of Speech Using a Scalable Pulse Codebook", Proceedings IEEE Workshop on Speech Coding 2000, Lake Delavan, Wis., September, 2000. The technique is scalable to a wide range of bit rates. The method improves the coding efficiency of multiple pulse ACELP tracks in wideband speech coding. The method was also shown to be extendable beyond Algebraic Code-Excited Linear Predictive (ACELP) speech coders, such that the standard track constraints are eliminated while still achieving high quality speech.

Three principal figures of merit for speech encoding methods include: the bit rate, the quality of the reconstructed speech, and the amount of computation necessary to encode and decode the speech or similar information signal. Improvements may be made for a fixed bit rate by using improved codes to increase the computational efficiency of the encoder, and incorporating techniques for improved error resiliency of the transmitted codewords to achieve higher quality speech transmission.

It is an object of this invention, therefore, to improve upon the computational complexity of indexed coding and decoding, to provide higher error resiliency associated with factorial packing methods, and to overcome the deficiencies and obstacles described above.

SUMMARY OF THE INVENTION

One aspect of the invention provides a method of coding an information signal. An information signal may be represented by a sequence of pulses. A plurality of pulse parameters based on the sequence of pulses may be determined, with one of the pulse parameters corresponding to the number of non-zero pulse positions in the sequence of pulses. The non-zero pulse parameter may be coded using a variable-length codeword.

Parameters may represent the number of non-zero pulses in the sequence of pulses, the location or positions of the non-zero pulses, the magnitudes of the non-zero pulses, and the phase or signs of the non-zero pulses.

The coded pulse parameters may be assembled into a sequence of codewords. The first codeword may represent the number of non-zero pulses in the sequence of pulses. The non-zero pulse parameter may be coded using a variable-length Huffman code. The pulse position parameter ma be coded using a combinatorial expression related to the total number of available positions and the number of non-zero positions in the sequence of pulses. The combinatorial function may be accessed using a medium memo storage routine (MMSR). The combinatorial function may be accessed using a smallest memory storage routine (SMSR). The pulse magnitude parameter may coded using a combinatorial function related to the sum of the pulse magnitude and the number of non-zero pulse positions in the sequence of pulses. The combinatorial function may be accessed using a medium memory storage routine. The combinatorial function may be accessed using a smallest memory storage routine. The pulse magnitude parameter may contain a predetermined sum of pulse magnitudes in the sequence of pulses. The pulse phase parameter may represent the signs or phases of the non-zero pulse positions in the sequence of pulses.

The information signal may comprise a time-domain signal. The information signal may comprise a frequency-domain signal. The information signal may include a speech signal, a transformed speech signal, an audio signal, a transformed audio signal, an image signal, a transformed image signal, a video signal, and a transformed video signal.

Another aspect of the current invention is a system for coding an information signal. The coder may comprise a means for representing the information signal by a sequence of pulses; a means for determining a plurality of pulse parameters based on the sequence of pulses including a non-zero pulse parameter corresponding to a number of non-zero pulse positions in the sequence of pulses; and a means for coding the non-zero pulse parameter using a variable-length codeword. The system may further comprise a means for assembling the coded pulse parameters into a sequence of codewords.

Another aspect of the current invention is a computer usable medium including a program for coding an information signal. The program may contain computer program code for representing the information signal by a sequence of pulses; computer program code for determining a plurality of pulse parameters based on the sequence of pulses, including a non-zero pulse parameter corresponding to a number of non-zero pulse positions in the sequence of pulses; and computer program code for coding the non-zero pulse parameter using a variable-length codeword.

The program may also include computer program code for assembling the coded parameters into a sequence of codewords.

Another aspect of the current invention is a method of decoding an information signal. A plurality of codewords may be received from a source. A set of characteristics of the information signal may be determined based in part on a variable-length codeword representing the number of non-zero pulse positions contained in the information signal. The information signal may be decoded based on the set of characteristics. The set of characteristics may include the positions or locations of non-zero pulses, pulse magnitudes and pulse phases.

The information signal may be a speech signal, a transformed speech signal, an audio signal, a transformed audio signal, an image signal, a transformed image signal, a video signal, or a transformed video signal. The information signal may comprise a time-domain signal, or the information signal may comprise a frequency-domain signal. The codewords may be received from a communications channel. The codewords may be received from a storage device.

Another aspect of the current invention is a system for decoding an information signal. The information decoding system may include a means for receiving a plurality of codewords from a source, a means for determining a set of characteristics of the information signal based in part on a variable-length codeword representing the number of non-zero positions contained in the information signal, and a means for decoding the information signal based on the set of characteristics.

Another aspect of the current invention is a computer usable medium including a program for decoding an information signal. The program may contain computer program code for receiving a plurality of codewords from a source; computer program code for determining a set of characteristics of the information signal based in part on a variable-length codeword representing the number of non-zero pulse positions contained in the information signal; and computer program code for decoding the information signal based on the set of characteristics.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
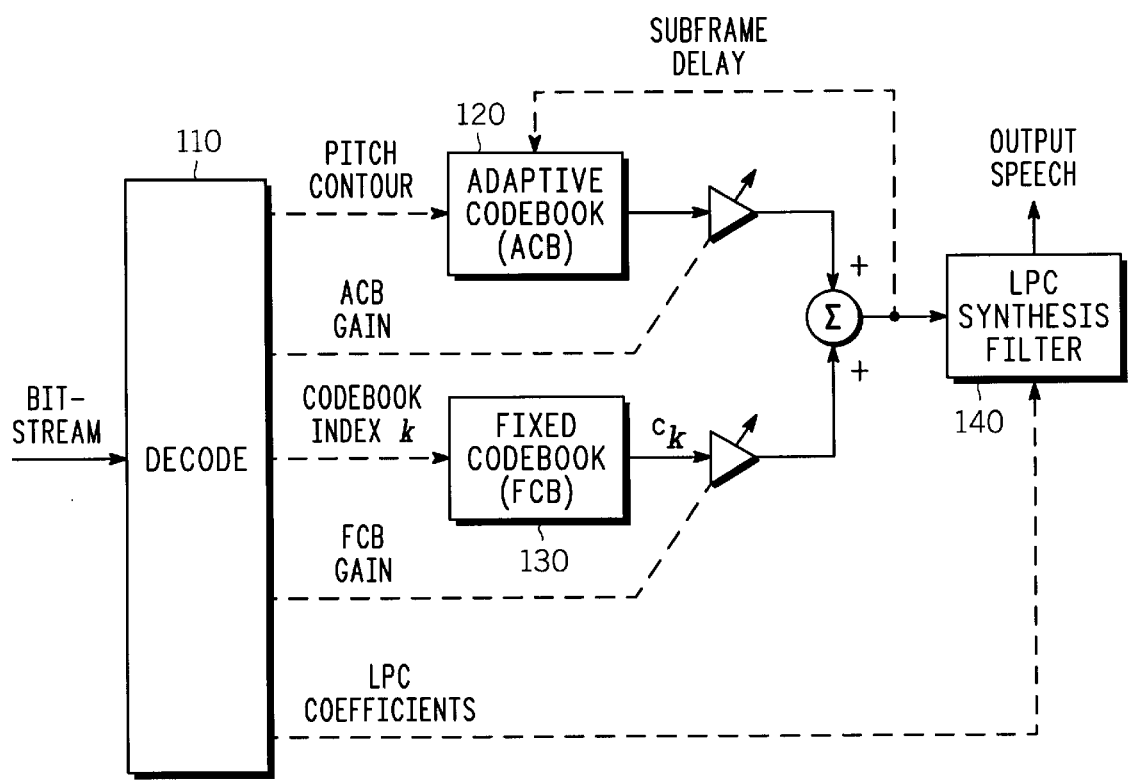
FIG. 1 is a schematic diagram of a typical code-excited linear prediction (CELP) speech synthesizer.

FIG. 1 shows a typical code-excited linear prediction (CELP) synthesizer at 100. CELP synthesizer 100 comprises decoder 110, adaptive codebook (ACB) 120, fixed codebook (FCB) 130 and linear predictive coding (LPC) synthesis filter 140. A bit stream representing a coded information signal may be fed into decoder 110 at a variable rate, depending on the quality and capacity of the communication or transmission channel. The coded information signal may be received from a communications channel or from a storage device. The information signal may be represented by a set of characteristics. The set of characteristics or parameters may include the number of non-zero pulses, positions or locations of non-zero pulses, pulse magnitudes, and pulse phases. Codewords representing the characteristics may be transmitted to the decoder, and the information signal may be decoded based on the set of characteristics. The information signal may be a time-domain signal, or it may be a frequency-domain signal. Decoder 110 may provide a set of outputs representing each sample of the encoded speech, audio, image or video information signal. The set of outputs include pitch contour, adaptive codebook (ACB) gain, codebook index k, fixed codebook (FCB) gain, and LPC coefficients. Adaptive codebook (ACB) 120 may receive pitch contour information from decoder 110. The output of adaptive codebook 120 may be amplified by the ACB gain information. Fixed codebook (FCB) 130 may receive codebook index k information from decoder 110. Fixed codebook 130 may produce the excitation vector $c_k$. The excitation vector $c_k$ may be amplified by the FCB gain. The amplified excitation vector $c_k$ and amplified adaptive codebook output may be summed and provided as feedback to adaptive codebook 120. The feedback may be delayed by the amount of time represented by one sub-frame, for example, five milliseconds. The amplified adaptive codebook output and amplified excitation vector $c_k$ may also be provided to LPC synthesis filter 140, along with LPC coefficients from decoder 110. LPC synthesis filter 140 may then provide a sample of reconstructed speech or other decoded information signal.

Algebraic code-excited linear prediction (ACELP) speech coders may use a fixed codebook in a multi-pulse configuration where an excitation vector $c_k$ contains integral valued pulses. The predictive portion and the excitation vector $c_k$ may be generated by the encoder and transmitted to a receiver where the information signal is reconstructed. ACELP coders are a particular implementation of CELP coders. The ACELP coder may provide linear predictive coefficients representing a predictive portion of the information signal, and a pulse configuration representing a residual portion of the information signal. Some constraints may be placed on the pulse configurations, in order to efficiently search the pulse configuration and to represent the pulse configuration with a reduced number of bits. An effective, efficient search may minimize distortions in the information signal reconstruction.

For example, the fixed codebook of the IS-127 Rate 1 coder contains only eight unit-magnitude pulses per sub-frame. A sub-frame of size 55 may be divided into five tracks. Pulses on Track 0 may occupy positions 0, 5, 10,... 50; pulses on Track 1 may occupy positions 1, 6, 11,..., 51; and so on. This inter-positioning of the pulses is known as interleaved pulse permutation. Three of the tracks may contain two pulses each and two tracks may contain one pulse each.

To improve the performance of the speech coder, some of the constraints may be removed. Consider the case where the constraints of the IS-127 coder are removed, for example, where the pulse configuration is no longer divided into tracks. The remaining constraints on the pulse configuration are: the pulses are integral valued, and the sum of the pulse magnitudes is a constant. The sum of the pulse magnitudes may be predetermined. The predetermined sum may be, for example, the sum of logarithmic domain magnitudes in the sequence of pulses.

Let n be the size of a sub-frame, $I_i$ be the pulse values and m be the sum of pulse magnitudes, i.e., $$m = \sum_{0}^{n-1} |I_i| \qquad 0 \le i < n \qquad (1)$$

To represent the pulse configuration with a minimum number of bits, a total ordering relation between the pulse configurations may be defined and an index may be enumerated or assigned to each configuration. This index is equal to the order of the pulse configuration in the total order. For example, index=0 corresponds to the minimum pulse configuration, and the maximum index, which is one less than the possible number of pulse configurations, corresponds to the maximum pulse configuration.

The information contents of a pulse configuration may be divided into four constituents: 1) number of non-zero pulse positions (Sn) in the pulse configuration; 2) relative or absolute position of the non-zero pulses (Sp) in the pulse configuration; 3) magnitude of the non-zero pulses (Sm); and 4) signs or phases of the non-zero pulses (Ss). The number of non-zero pulse positions in a sequence of pulses may correspond to the number of positions that have non-zero pulses, described by a non-zero pulse parameter. The location or position of the non-zero pulses may be described by a pulse position parameter. The pulse position of the non-zero pulses may be relative or absolute; for example, if two pulses in an 80-position sub-frame are located at positions 3 and 20, the absolute positions may be 3 and 20, whereas the relative positions may be 3 and 17. The magnitude of the non-zero pulses may be described by a pulse magnitude parameter. In the case where all non-zero pulse positions have unit magnitude, the number of non-zero pulse positions may equal the sum of the pulse magnitudes. In the case where one or more pulse positions are allowed to have stacked pulses, the number of non-zero pulses would be less than the sum of the pulse magnitudes. The magnitude of non-zero pulses may be one for unit magnitude pulses, or an integral value for cases where pulses may be stacked. The signs or phases of the non-zero pulses may be positive or negative, indicated, for example, by a "0" or a "1", respectively, and may be described by a pulse phase parameter. The signs of the pulses may be represented by a string of bits, arranged accordingly. The sign or phase of each non-zero pulse may be, for example, 0 degrees or 180 degrees, or some fraction thereof such as +/−90 degrees.

Segregating the information contents of a pulse configuration may increase channel error robustness during transmission. The constituent information may be partially or completely segregated. With complete information segregation, none of the bits in the codeword is affected by more than one of the constituents. The combination of constituent codewords to form a complete codeword may be constructed without addition and multiplication operations. The codeword may be formed by concatenation of the constituent codewords. Huffman coding may be used to specify $S_n$ and either FP or CPC approaches may be used to specify the other constituents, referred to as Huffman-coded factorial packing (HCFP).

To completely segregate the constituent information, a codeword may be formed by concatenating the individual codewords for $S_n$, $S_p$, $S_m$, and $S_s$. Let C be the codeword and let $C_n$, $C_p$, $C_m$, and $C_s$ be the codewords for $S_n$, $S_p$, $S_m$, and $S_s$, respectively. Thus, $$C = \{C_n C_p C_m C_s\}. \qquad (2)$$

Dependence of $C_m$, $C_p$, and $C_s$ on $S_n$ necessitates the decoding of $S_n$ prior to decoding the other constituents.

Using an instantaneously decodable code for $S_n$, together with placing $C_n$ at the codeword (C) boundary, facilitates independent decoding of $S_n$. A Huffman Code may be used as the instantaneously decodable code for $S_n$. Once $S_n$ is decoded correctly, codewords $C_m$, $C_p$, and $C_s$ may be retrieved from C, and $S_m$, $S_p$, and $S_s$ may be decoded, respectively. The codeword C has the desired information segregation property.

The length of the codeword C should be close to the length of the corresponding codeword of FP or CPC, which are the minimum possible length. Let n be the sub-frame length or number of available positions, and m be the sum of pulse magnitudes. Note that $1 \leq S_n \leq \min(n,m)$. In the subsequence, a codeword may be designed having the desired property, and the length of the codeword may be close to the minimum possible length.

Let the number of unique combinations of k elements over n possibilities be $$F(n,k) = \begin{cases} \dfrac{n!}{k!(n-k)!}, & n \geq 0, n \geq k \\ 0, & \text{otherwise} \end{cases} \quad (3)$$

Furthermore, $l_n(S_n)$ be the length of $C_n$, $l_p(S_n)$ be the length of $C_p$, $l_m(S_n)$ be the length of $C_m$, and $l_s(S_n)$ be the length of $C_s$. Note that for a given $S_n$, $l_p(S_n)=\lceil \log_2[F(n,S_n)] \rceil$, $l_m(S_n)=\lceil \log_2[F(m-1, S_n-1)] \rceil$, and $l_s(S_n)=S_n$. The length L of the codeword C is given by $$L = \max_{S_n} l_m(S_n) + l_n(S_n) + l_p(S_n) + S_n. \quad (4)$$

The codeword length $l_n(S_n)$ is such that the sum of right hand side in equation (4) is assumed to be the same for all $S_n$. Then, $$l_n(S_n) = L - (l_m(S_n) + l_p(S_n) + S_n) \quad (5)$$

The codeword length $l_n(S_n)$ may be determined such that $C_n$ is uniquely decodable. For unique decodeability, $l_n(S_n)$ must satisfy the Kraft inequality, i.e., $$\sum_{S_n=1}^{S_n=\min(m,n)} 2^{-l_n(S_n)} \leq 1. \quad (6)$$

Solving for the codeword length L, $$L \geq \left\lceil \log_2 \left( \sum_{S_n=1}^{S_n=\min(m,n)} 2^{l_m(S_n)+l_p(S_n)+S_n} \right) \right\rceil. \quad (7)$$

The value of L may be chosen to satisfy the equality in equation (7).

The minimum codeword length $L_{min}$ may be given by:

$$L_{min} = \left\lceil \log_2 \left( \sum_{S_n=1}^{S_n=\min(m,n)} F(n, S_n) \cdot D(m, S_n) \cdot 2^{S_n} \right) \right\rceil \quad (8)$$

where $D(m,S_n)=F(m-1,S_n-1)$. Since $l_p(S_n)=\lceil \log_2[F(n,S_n)] \rceil$ and $l_m(S_n)=\lceil \log_2[D(m,S_n)] \rceil$, then $2^{l_p(S_n)} \leq 2F(n, S_n)$, and $2^{l_m(S_n)} \leq 2D(m,S_n)$. Thus, from equation (7) and equation (8), the length of the codeword C may be given by:

$$L \leq 2 + L_{min}. \quad (9)$$

This relationship shows that the length L of the codeword C is not more than two bits in excess of the minimum length, $L_{min}$. The codeword lengths for FP ($L_{min}$) and HCFP (L) for various values of m and n are shown in Table 1. The length of the codeword is indeed close to (not more than two bits in excess of) the minimum length.

TABLE 1

| SUB-FRAME SIZE N | SUM PULSE MAGNITUDE M | $L_{min}$ | L |
|---|---|---|---|
| 107 | 7 | 42 | 43 |
| 107 | 9 | 52 | 52 |
| 107 | 12 | 65 | 66 |
| 80 | 8 | 44 | 44 |
| 80 | 9 | 48 | 48 |
| 80 | 39 | 133 | 134 |

The codeword $C_n$ may be constructed by first constructing a Huffman tree, then forming codewords from the tree. Construction algorithms may be found, for example, in Cover and Thomas, "Elements of Information Theory", John Wiley and Sons, New York, 1991. The length L of codeword C may be obtained using equation (7), and then obtaining $l_n(S_n)$ from equation (5). These values of $l_n(S_n)$ may be used as the starting point in the construction of the Huffman tree.

Figure 2:
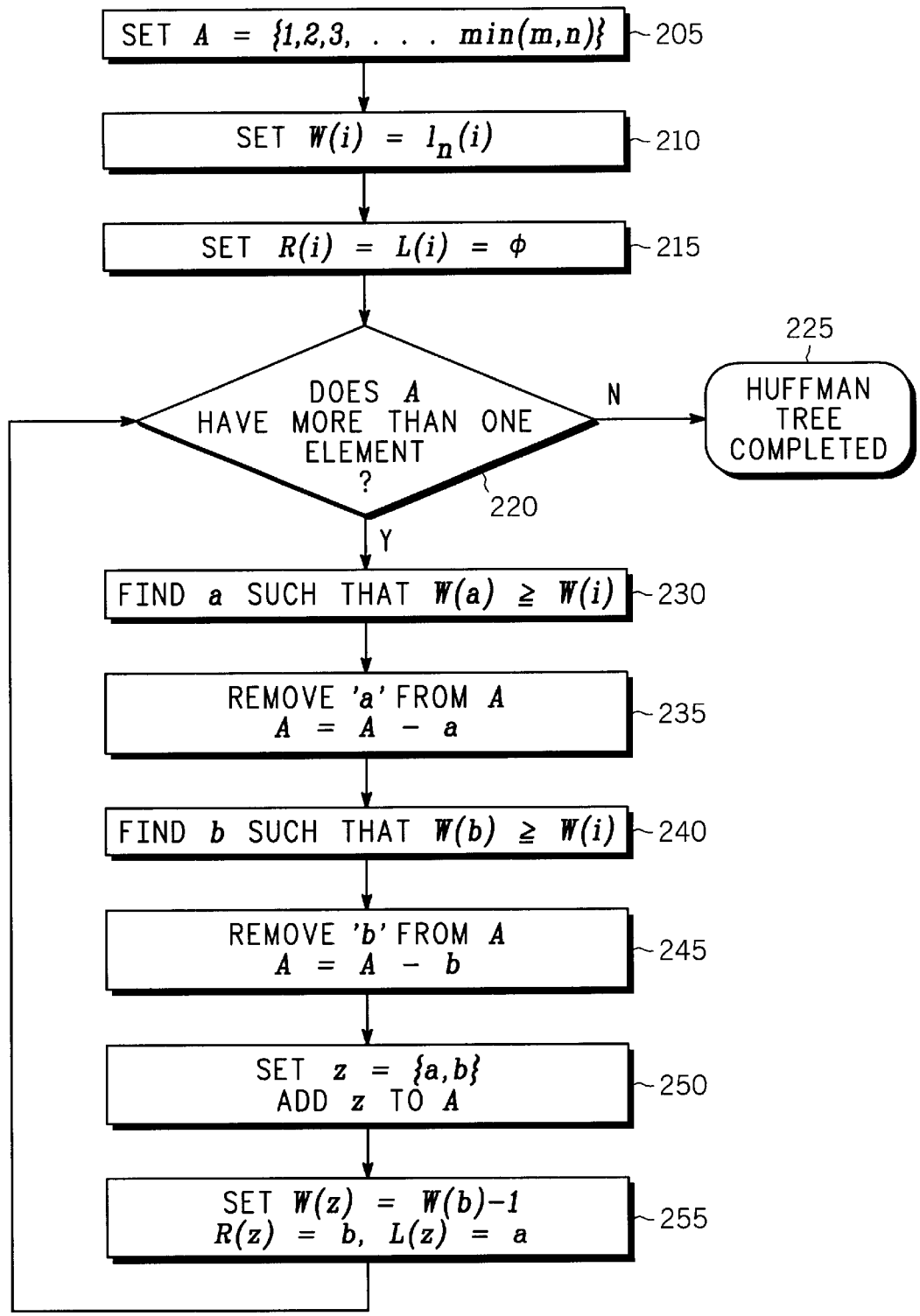
FIG. 2 is a flow diagram for constructing a Huffman tree, in accordance with the current invention.

FIG. 2 shows a flow diagram for constructing a Huffman tree, in accordance with the present invention at 200. Huffman tree construction method 200 comprises various steps to determine values of $l_n(S_n)$.

As seen at block 205, elements of a set A may be defined with corresponding indices i extending from 1 to min(m,n). For all indices i, a set of weights $W(i)=l_n(i)$ may be assigned as seen at block 210. As seen at block 215, a right set of elements $R(i)=\phi$ and a left set of elements $L(i)=\phi$ may be defined, where $\phi$ is an empty set.

If set A contains more than one element as seen at block 220, an element a of set A may be identified such that the weight assigned to element a is equal to or larger than the weight of any other element in set A, as seen at block 230. As seen at block 235, element a of set A may be removed from the set. A second element b of set A may be identified such that the weight of element b is equal to or larger than the weight of any other element in set A, as seen at block 240. As seen at block 245, element b of set A may be removed from the set. Set z={a,b} may be formed where a and b corresponding to elements a and b are removed from set A, such that set z is equal to {a,b} as seen at block 250, and added back as a subset into set A. As seen at block 255, the weight of set z={a,b} may be assigned a value equal to the weight of removed element b minus one. Also, R({a,b}) is set equal to element b, and L({a,b}) is set equal to element a. As seen at block 220, the cycle of defining the next pair of elements from set A may continue until only a single element remains in set A. When a single element remains in set A, the element in set A is defined as the root of the Huffman tree, and the Huffman tree may be completed as seen at block 225.

The codeword $C_n(S_n)$ for $S_n$ may be constructed by traversing the path from the root of the Huffman tree to element $S_n$. Starting with the root of the Huffman tree and an empty code string, "1" may be appended to the code string while going to the right, otherwise a "0" may be appended. Additional "1 s" and "0s" may be appended to the code string until $S_n$ is reached. Codeword $C_n$ may be placed at the boundary of C. If $C_n$ is placed at the right side boundary (most significant bit) then the code string is $C_n(S_n)$, and if it is placed at the left side boundary (least significant bit), then a mirror image of the code string results. The length of each codeword $C_n(S_n)$ may be less than $l_n(S_n)$. If the length of $C_n(S_n)$ is less than $l_n(S_n)$, then $l_n(S_n)$ may be set equal to the length of $C_n(S_n)$. Finding the Huffman code for each $S_n$ may be a computationally intensive process, hence $C_n(S_n)$ and their lengths $l_n(S_n)$ may be pre-computed and stored.

As an illustrative example of one aspect of the invention, the case of m=8 and n=80 may be considered. For this example, Table 2 shows the various combinations of non-zero positions ($S_n$), pulse locations ($S_p$), pulse magnitudes ($S_m$), and pulse signs ($S_s$). Also in the table are the bit field lengths for each of the respective combinations, length of the coded non-zero pulse parameter, and an example of a Huffman code set that is representative of the number of non-zero pulse positions, in accordance with the invention. The pulse position parameter $S_p$ may be determined from the combinatorial function $F(n, S_n)$, where n is the total number of available positions in the sequence of pulses and $S_n$ is the number of non-zero pulse positions in the sequence of pulses. Note that $S_n=m$ if all pulses have unit magnitude. The pulse magnitude parameter $S_m$ may be determined from the combinatorial function $F(i-1,m-1)$ where i is a sum of pulse magnitudes in the sequence of pulses and m is the number of non-zero pulse positions in the sequence of pulses. The pulse phase parameter Ss may be computed as two raised to the $S_n$ power.

may be more complex than the CPC decoder, which has a single divide operation. Efficient computation of $C_p$ and $C_m$ may necessitate pre-computation and storage of $F(s,k)$. The storage of $F(s,k)$ may benefit from low-complexity, memory-efficient implementations of HCFP. These implementations may also apply to FP and CPC coding schemes. The implementations may be suitable for applications where m and n may vary. One application may be, for example, representation of the fixed codebook pulse configuration for adaptive multi-rate wideband (AMRWB) speech coders. AMRWB coders may have many modes, each catering to various bit rates. For each mode, the value of m and n may be different. For example, the sub-frame size n may be 107 or 80, corresponding to 3 or 4 subframes per frame, respectively. The sum of pulse magnitudes m for n=107 may range between 7 and 15, while the sum of pulse magnitudes m for n=80 may range from 12 to 39.

As an example, assume that m and n are fixed. Since $F(s,k)=F(s,s-k)$, values for $F(s,k)$ only in the upper triangular region given by $0 \leq k \leq m$ $2k \leq s \leq max(m,n)$ need to be stored. The values of $F(s,k)$ may be stored by computing the size of the largest $F(s,k)$ in the triangular region and staring all of $F(s,k)$ by using an allocated memory size capable of storing the largest $F(s,k)$, simply referred to as the largest memory storage method (LMSM) or largest memory storage routine. The LMSM approach may enable faster access to $F(s,k)$ simply, although may result in wastage of large amounts of memory due to possible large variation in the

TABLE 2

| $S_N$ | $S_P$ | $S_M$ | $S_S$ | $l_p(S_n) = \lceil \log_2(S_P) \rceil$ | $l_m(S_n) = \lceil \log_2(S_m) \rceil$ | $l_s(S_n) = \lceil \log_2(S_s) \rceil$ | $L_1 = \sum_{i \in [p,m,s]} l_i(S_n)$ | $l_n(S_n) = L - L_1$ | HUFFMAN CODE $C_n$ |
|---|---|---|---|---|---|---|---|---|---|
| 8 | 28987537150 | 1 | 256 | 35 | 0 | 8 | 43 | 1 | 1 |
| 7 | 3176716400 | 7 | 128 | 32 | 3 | 7 | 42 | 2 | 01 |
| 6 | 300500200 | 21 | 64 | 29 | 5 | 6 | 40 | 4 | 0001 |
| 5 | 24040016 | 35 | 32 | 25 | 6 | 5 | 36 | 8 | 00000001 |
| 4 | 1581580 | 35 | 16 | 21 | 6 | 4 | 31 | 13 | 000 . . . 001 |
| 3 | 82160 | 21 | 8 | 17 | 5 | 3 | 25 | 19 | 000 . . . 001 |
| 2 | 3160 | 7 | 4 | 12 | 3 | 2 | 17 | 27 | 000 . . . 001 |
| 1 | 80 | 1 | 2 | 7 | 0 | 1 | 8 | 36 | 000 . . . 001 |

Figure 3:
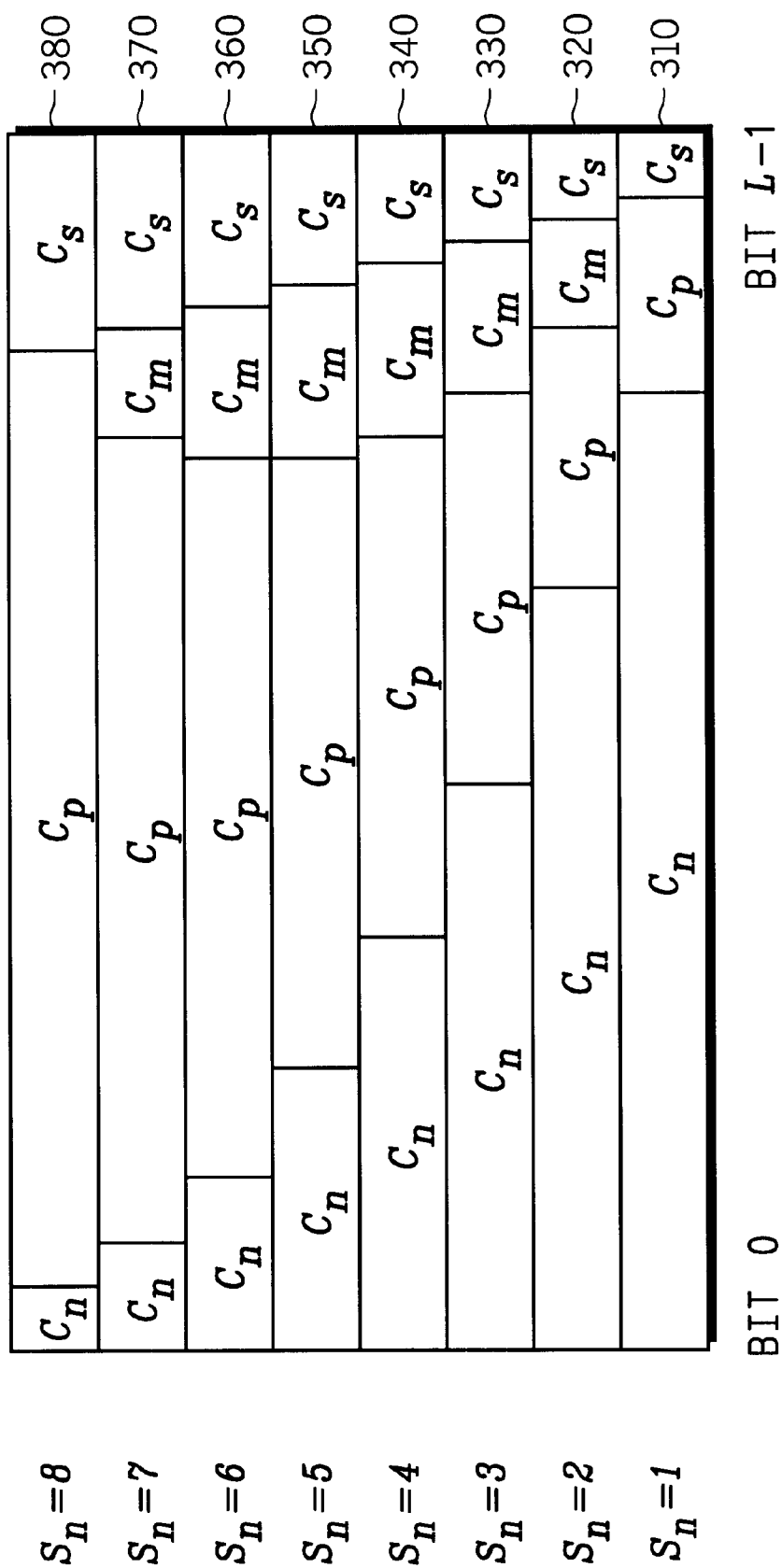
FIG. 3 is an illustration of the dynamic bit allocation of codewords for the case m=8 and n=80, in accordance with the current invention.

FIG. 3 shows an illustrative example of the dynamic bit allocation of codewords for the case m=8 and n=80, in accordance with the current invention at 300. This example illustrates the "dynamic" bit allocation implied by the construction of the complete codeword C, which may be a concatenation of the variable-length codewords for each of the various parameters. Rows 310, 320, 330, 340, 350, 360, 370 and 380 correspond to the number of non-zero pulse positions in the pulse configuration from one to eight, respectively. The coded $S_n$ or non-zero pulse parameter has a variable length and may be assembled with other pulse parameters, with the coded non-zero pulse parameter assembled first, as shown at the left hand side starting at bit 0. Other codewords representing $S_p$, $S_m$ and $S_s$ respectively, follow $C_n$ in segregated bit fields. In row 310 and in row 380, the codeword representing $S_m$ may be omitted due to its length being identically zero. Each of the various bit allocations may be uniquely determined by the decoding of the $S_n$ parameter, which may be represented by a Huffman code. Note that all rows in this example have the same length, referred to as maximum-length Huffman code.

CPC as well as FP may be used for encoding $S_p$ and $S_m$. Even though FP may be less bit error sensitive than CPC, the FP decoder may require several divide operations and hence size of $F(s,k)$. For example, the size of $F(107, 1)$ is one word while the size of $F(107,39)$ is 98 bits or seven words with 16 bits per word.

A second approach to storing $F(s,k)$ that may be more memory efficient uses memory equal to the size of $F(s,k)$. This approach may require storing the size of each $F(s,k)$, and may result in complex $F(s,k)$ access. However, properties of $F(s,k)$ may enable the storing of $F(s,k)$ that eliminates wastage of memory space and reduce the complexity of the $F(s,k)$ access. As an example, assume m=39 and n=107, and consider the sizes of $F(s,k)$, $2k \leq S \leq max(m, n)$ for a given $k \leq m$. For k=39, the minimum size may be five words (s=78), and the maximum size may be 7 words (s=107). For k=20, the minimize size may be three words (s=40) and the maximum size may be five words (s=107). Thus, for a fixed k, the range of sizes of $F(s,k)$ may be comparatively small.

In the triangular region, because $2k \leq s \leq max(m,n)$, $$F(s+1, k) = \frac{s+1}{s+1-k} F(s, k) < 2F(s, k). \quad (10)$$

This equation indicates that for a given k, an increase in the value of s by one unit may result in an increase in the size of $F(s,k)$ by no more that one bit. Therefore, there may not be an increase in the number of memory words required to store F(s,k) until s increases by as much as 16.

For each value of k, a size parameter and two lists, referred to as List A and List B, may be determined. The size parameter may store the size of F(2k,k), which has the smallest size for a given k. In List A, the values of s may be stored for which the size of F(s,k) is greater than the size of F(s−1,k). These values of s may be stored in increasing order. For example, the smallest s for which there is a size change may be stored at the head of the list, the next higher value of s for which there is a size change may be stored at the next location in the list, and so on. In List B, F(s,k), 2k≦s≦max(m,n), may be stored in contiguous memory addresses using a memory size equal to the size of F(s,k).

Figure 4:
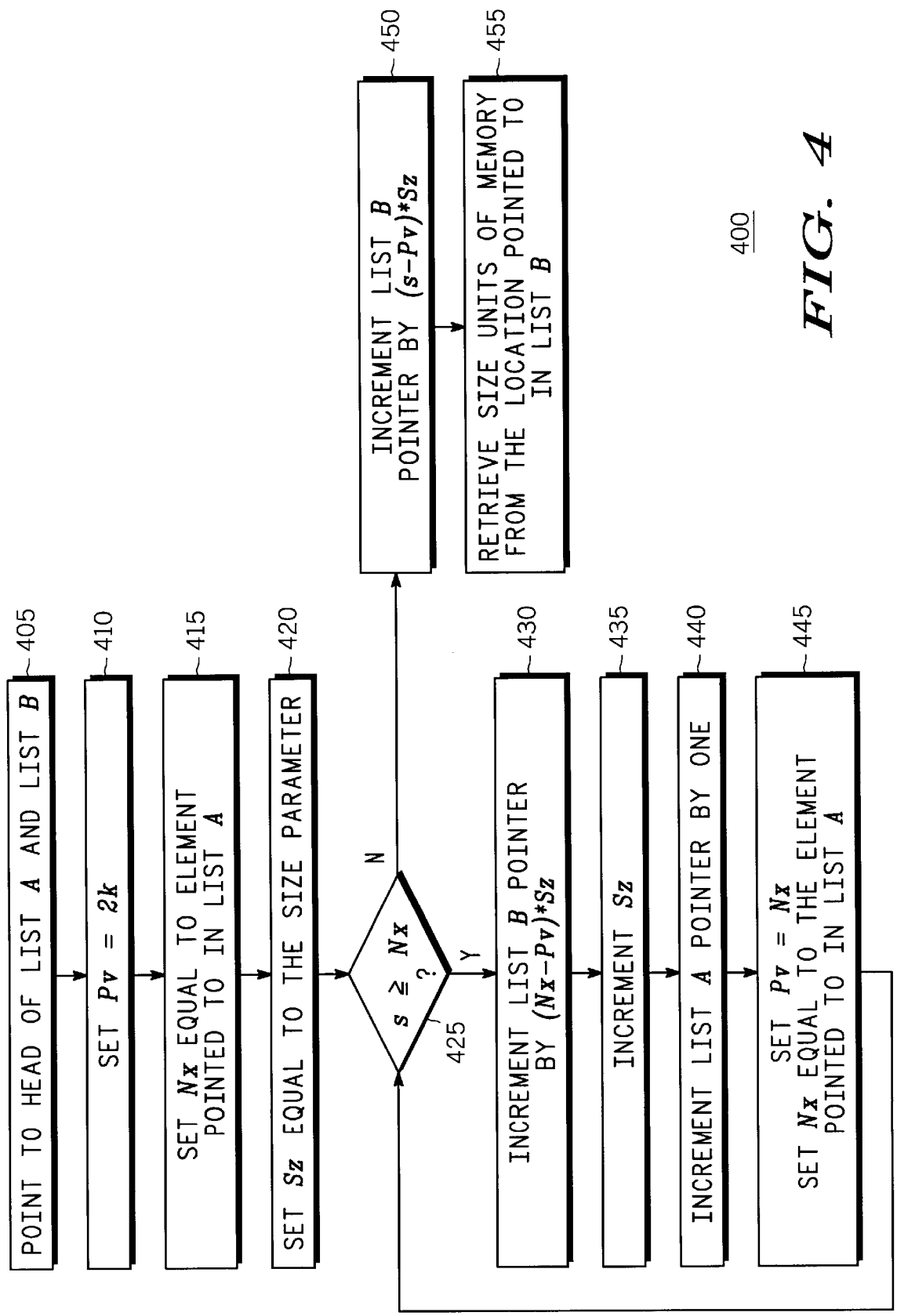
FIG. 4 is a flow diagram for accessing F(s,k), in accordance with the current invention.

FIG. 4 shows a flow diagram for accessing F(s,k), in accordance with the present invention at 400. F(s,k) access method 400 comprises various steps to access and retrieve values for the size of F(s,k). As seen at block 405, pointers may be set pointing to the head of List A and to the head of List B. A variable Pv may be set equal to 2*k, as seen at block 410. As seen at block 415, a variable Nx may be set equal to the element at the head of List A. As seen at block 420, a variable Sz may be set equal to the size parameter. As seen at block 425, if s is greater than or equal to Nx, then the List B pointer may be incremented by Sz times the quantity Nx minus Pv, as seen at 430. Variable Sz may then be incremented by one, as seen at block 435. The List A pointer may be incremented by one, as seen at block 440. As seen at block 445, the variable Pv may be set equal to the variable Nx, and Nx may be set equal to the element pointed to in List A. A check may be made whether s is greater than or equal to Nx, as seen at block 425. If so, then steps indicated by blocks 430, 435, 440 and 445 may be repeated. If not, then the B list pointer may be incremented by Sz times the quantity s minus Pv as seen at block 450, and the memory may be accessed at the location pointed to in List B to retrieve the size units of memory stored in List B as seen at block 455.

For a given k, the dynamic range of the size of F(s,k) may be small, and F(s,k) access method 400 may be looped only a few times. Therefore, F(s,k) access method 400 may need only a few multiply-accumulate instructions to access F(s,k). This method may be referred to as the smallest memory storage method (SMSM) or smallest memory storage routine.

In a modification of the F(s,k) access method 400, for a given k, the size of F(max(m,n),k) may be found which is the largest size of F(s,k) in the range 2k≦s≦max(m, n)), and then each F(s,k) may be stored using that size. This may result in a slight increase in required memory, though facilitates access to F(s,k) in a single multiply-accumulate instruction, omitting loop back operations that may occur in the SMSM method. This modification may be referred to as the medium memory storage method (MMSM) or medium memory storage routine. Table 3 shows comparisons of memory requirements in sixteen bit words for the three F(s,k) storage methods for various values of m and n. The storage methods may be used with other encoding schemes, such as conditional product code (CPC) and conditional product-product code (CPPC).

TABLE 3

| N | m | SMSM | MMSM | LMSM |
|---|---|------|------|------|
| 80 | 39 | 4.6 K | 5.2 K | 7.6 K |
| 80 | 20 | 2.8 K | 3.3 K | 4.5 K |
| 107 | 20 | 4.5 K | 5.4 K | 8.2 K |
| 107 | 39 | 9 K | 10.6 K | 17.9 K |
| 60 | 50 | 2 K | 2.2 K | 3.4 K |

One of the motivations and benefits of using a Huffman code is the segregation of constituent information, with increased robustness to bit errors. In applications where error protection may be unequal, the bits may be classified into groups on the basis of their sensitivity to bit errors, and then may use better channel error protection for bits that are more sensitive, and less channel error protection for bits that are less sensitive. Huffman code bits may be sensitive to bit errors and use of shorter length Huffman codes may reduce the number of sensitive bits. A Huffman code is desirable in that the length of the longest Huffman code is smallest, and at the same time the length L of the complete codeword C is not lengthened. Such a Huffman code may be constructed by setting $l_n(S_n)$ to the one given by equation (5), and then finding the smallest h such that $$\sum_{S_n=1}^{S_n=\min(m,n)} 2^{-\min(l_n(S_n),h)} \leq 1. \tag{11}$$

Once h is found, $l_n(S_n)$ may be set equal to $\min(l_n(S_n),h)$, and they may be used as the starting point for the construction of the Huffman tree.

Alternatively, the length $l_n(S_n)$ may be set somewhere between the two ends, for example, between $l_n(S_n)$ and h. In addition to having a lesser number of error sensitive bits, shorter Huffman code may also result in less memory space required for storing the Huffman codes. For applications such as an AMRWB coder where various values of m and n may be used, the savings may be appreciable. A complexity comparison between the HCFP and the CPC method indicates that HCFP may be half as complex as CPC. Faster encoding and decoding using CPC may necessitate storing an offset representing $S_n$, which may be nearly as large as the codeword, and much larger than the Huffman code. The HCFP method therefore may require less memory than CPC.

A shorter Huffman code also may result in faster decoding of the Huffman code. Additionally, because the codeword for $S_n$ may be placed as the first received constituent codeword, each subsequent constituent codeword may be decoded without waiting for reception of the complete codeword.

As an example of the modified Huffman code, consider the case for m=8 and n=80. Table 4 shows the minimum-length Huffman codewords for this case. Table 4 shows similar information to Table 3, except that the length of the Huffman code is determined using the shorter length Huffman code. The table shows that the number of bits requiring channel error protection may be significantly reduced using the modified Huffman code.

TABLE 4

| $S_N$ | $S_P$ | $S_M$ | $S_S$ | $l_p(S_n) = \lceil \log_2(S_p) \rceil$ | $l_m(S_n) = \lceil \log_2(S_m) \rceil$ | $l_s(S_n) = \lceil \log_2(S_s) \rceil$ | $L_1 = \sum_{i \in \{p,m,s\}} l_i(S_n)$ | $l_n(S_n)$ | HUFFMAN CODE $C_n$ |
|---|---|---|---|---|---|---|---|---|---|
| 8 | 28987537150 | 1 | 256 | 35 | 0 | 8 | 43 | 1 | 1 |
| 7 | 3176716400 | 7 | 128 | 32 | 3 | 7 | 42 | 2 | 01 |
| 6 | 300500200 | 21 | 64 | 29 | 5 | 6 | 40 | 3 | 001 |
| 5 | 24040016 | 35 | 32 | 25 | 6 | 5 | 36 | 4 | 0001 |
| 4 | 1581580 | 35 | 16 | 21 | 6 | 4 | 31 | 6 | 000001 |
| 3 | 82160 | 21 | 8 | 17 | 5 | 3 | 25 | 6 | 000000 |
| 2 | 3160 | 7 | 4 | 12 | 3 | 2 | 17 | 6 | 000011 |
| 1 | 80 | 1 | 2 | 7 | 0 | 1 | 8 | 6 | 000010 |

Figure 5:
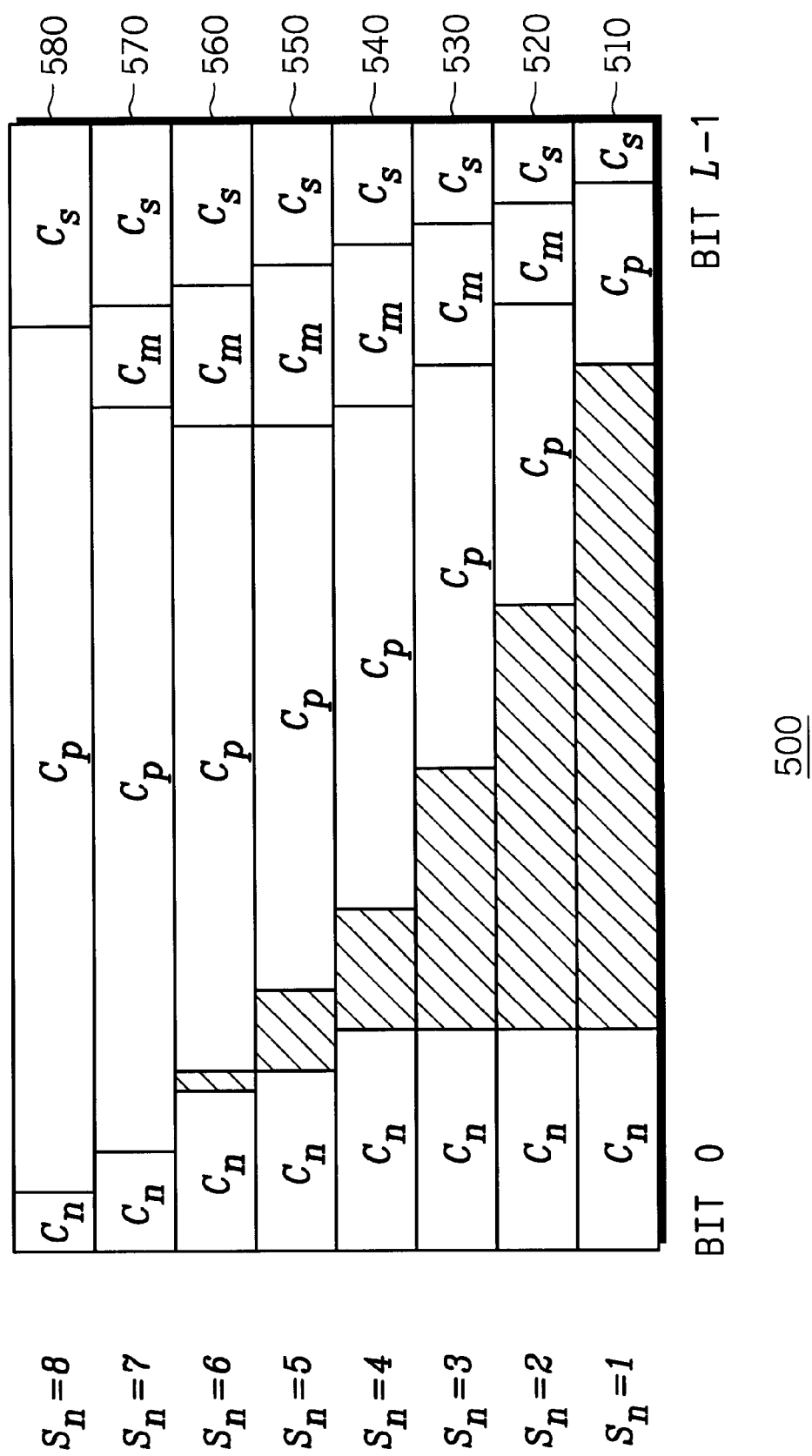
FIG. 5 is an illustration of the dynamic bit allocation of codewords using minimum-length Huffman codes for the case m=8 and n=80, in accordance with the current invention.

FIG. 5 illustrates an example of the dynamic bit allocation of codewords for the case m=8 and n=80 using the minimum-length modified Huffman code, in accordance with the current invention at 500. Codeword C is illustrated, which may be a concatenation of the variable-length codewords for each of the various parameters where $C_n$ may be generated with the modified Huffman code. Rows 510, 520, 530, 540, 550, 560, 570 and 580 correspond to the number of non-zero pulse positions in the pulse configuration from one to eight, respectively. The coded $S_n$ parameter has a variable length and may be much shorter than the corresponding length of $C_n$ as shown in FIG. 3. Other codewords representing $S_p$, $S_m$ and $S_s$ respectively, follow $C_n$ in segregated bit fields, though undeclared bit positions may occur between the coded parameters. In row 510 and in row 580, the codeword representing $S_m$ may be omitted due to its length being identically zero. Each of the various bit allocations may be uniquely determined by decoding $C_n$, which may be represented by the modified Huffman Code. FIG. 5 shows the effect of the bit allocation for each of the variations of number of non-zero positions ($S_n$). This diagram shows that the number of bits requiring channel error protection may be significantly reduced.

A decoder for decoding an information signal may include several steps. The first step in the decoding process may begin by decoding $S_n$. Since $C_n$ is an instantaneously decodable code, $S_n$ may be readily decoded. Once $S_n$ is decoded, bits for $C_p$ and $C_m$ may be extracted. Decoding pulse positions from $C_p$ and pulse magnitudes from $C_m$ may utilize a procedure to find the smallest value of s such that F(s,k) is greater than a given constant. This procedure may be called $S_n$ times (k=1 to $S_n$) for pulse position decoding and $S_n$-1 times (k=1 to $S_n$-1) for pulse magnitude decoding. A method for doing this may include incrementing s starting with a minimum value until F(s,k) is greater than a given constant. This method may require many comparisons and many calls to F(s,k).

A bifurcation method may be used to find s. This method may significantly reduce the number of comparisons and function calls and hence may reduce the complexity of the decoder.

Pre-calculation of logarithms of an integer power of factorials may be used to assist in calculating logarithms of the power of F(s,k) without actually finding F(s,k). This method may facilitate the comparison between the logarithm of an integer power of F(s,k) to the logarithm of an integer power of the given constants. The pre-calculation may reduce the number of calls to F(s,k) and therefore may reduce the complexity of the decoder.

While the foregoing embodiments have been largely directed at CDMA and adaptive multi-rate wideband speech coder applications, the coding methods described are applicable to other coded transmission and storage applications, including audio compression, video compression, and more specifically, pyramid coding for video and images. While generally applicable to information signals such as speech signals, audio signals, image signals and video signals, the methods described are also applicable to derivatives and transformations of an information signal input, such as transformed speech signals, transformed audio signals, transformed image signals and transformed video signals. Transformed information signals may include speech prediction residual signals, transform domain residual signals, quantized speech residual signals, and long-term prediction residual signals; audio transform domain signals, spectral magnitudes, and spectral lines; DCT coefficients and transform coefficients; time domain signals and frequency domain signals.

While the embodiments of the invention disclosed herein are presently preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of coding an information signal comprising:
   representing the information signal by a sequence of pulses;
   determining a plurality of pulse parameters based on the sequence of pulses including a non-zero pulse parameter corresponding to a number of non-zero pulse positions in the sequence of pulses;
   coding the non-zero pulse parameter using a variable-length instantaneously decodable codeword; and
   coding at least one of a remaining plurality of pulse parameters to produce a codeword having a corrsponding length based on the number of non-zero pulse positions.

2. The method of claim 1 wherein the plurality of pulse parameters include a pulse position parameter, a pulse magnitude parameter and a pulse phase parameter.

3. The method of claim 2 wherein the pulse position parameter is coded in accordance with a function:

$$F(n, m) = \frac{n!}{(n-m)!m!}$$

where n is a is a total number of available positions in the sequence of pulses and m is the number of non-zero pulse positions in the sequence of pulses.

4. The method of claim 3 wherein the function F(n,m) is accessed using a medium memory storage routine (MMSR).

5. The method of claim 3 wherein the function F(n,m) is accessed using a medium memory storage routine (SMSR).

6. The method of claim 2 wherein the pulse magnitude parameter is based on a predetermined sum of pulse magnitudes in the sequence of pulses.

7. The method of claim 2 wherein the pulse phase parameter presents signs of the non-zero pulse positions in the sequence of pulses.

8. The method of claim 2 wherein the pulse magnitude parameter is coded in accordance with a function:

$$D(i, m) = \frac{(i-1)!}{(i-m)!(m-1)!}$$

where i is a sum of pulse magnitudes in the sequence of pulses and m is the number of non-zero pulse positions in the sequence of pulses.

9. The method of claim 8 wherein the function D(i,m) is accessed using a medium memory storage routine.

10. The method of claim 8 wherein the function D(i,m) is accessed using a smallest memory storage routine.

11. The method of claim 1 further comprising:
assembling the coded pulse parameters into a sequence of codewords.

12. The method of claim 11 wherein a first codeword represent the number of non-zero pulse positions in the sequence of pulses.

13. The method of claim 1 wherein the non-zero pulse parameter is coded using a variable-length Huffman code.

14. The method of claim 1 wherein the information signal comprises a time-domain signal.

15. The method of claim 1 wherein the information signal comprises a frequency-domain signal.

16. The method of claim 1 wherein the information signal is selected from a group consisting of a speech signal, a transformed speech signal, an audio signal, a transformed audio signal, an image signal, a transformed image signal, a video signal, and a transformed video signal.

17. A system for coding an information signal comprising:
means for representing the information signal by a sequence of pulses;
means for determining a plurality of pulse parameters based on a sequence of pulses including a non-zero pulse parameter corresponding to a number of non-zero pulse positions in the sequence of pulses;
means for coding the non-zero pulse parameter using a variable-length instantaneously decodable codeword; and
means for coding at least one of a remaining plurality of pulse parameters to produce a codeword having a corresponding length based on the number of non-zero pulse positions.

18. The system of claim 17 further comprising:
means for assembling the coded pulse parameters into a sequence of codewords.

19. A computer usable medium including a program for coding an information signal comprising:
computer program code for representing the information signal by a sequence a of pulses;
computer program code for determining a plurality of pulse parameters based on the sequence of pulses including a non-zero pulse parameter corresponding to a number of non-zero pulse positions in the sequence of pulses;
computer program code for coding the non-zero pulse parameter using a variable-length instantaneously decodable codeword; and
computer program code for coding at least one of a remaining plurality of pulse parameters to produce a codeword having a corresponding length based on the number of non-zero pulse positions.

20. The computer usable medium of claim 19 further comprising:
computer program code for assembling the coded pulse parameters into a sequence of codewords.

21. A method of decoding an information signal comprising:
receiving a plurality of codewords from a source;
determining a first characteristic, representing a number of non-zero pulse positions of a pulse sequence, based on a first variable length codeword;
determining a length of a second variable length codeword, representing a second characteristic of the pulse sequence, based on the first variable length codewords representing the first and second characteristics of the pulse sequence.

22. The method of claim 21 wherein the second characteristic of the pulse sequence is one of the set of characteristics of the pulse sequence to include location of non-zero pulses, pulse magnitudes, and pulse phases.

23. The method of claim 21 wherein the information signal is selected from a group consisting of a speech signal, a transformed speech signal, an audio signal, a transformed audio signal, an image signal, a transformed image signal, a video signal, and a transformed video signal.

24. The method of claim 21 wherein the information signal comprises a time-domain signal.

25. The method of claim 21 wherein the information signal comprises a frequency-domain signal.

26. The method of claim 21 wherein the plurality of codewords is received from a communications channel.

27. The method of claim 21 wherein the plurality of codewords is received from a storage device.

28. A system for decoding an information signal comprising:
means for receiving a plurality of codewords from a source;
means for determining a first characteristic, representing a number of non-zero pulse positions of a pulse sequence, based on a first variable length codeword;
means for determining a length of a second variable length codeword, representing a second characteristic of the pulse sequence, based on the first variable length codeword; and
means for decoding the pulse sequence based on the first and second codewords representing the first and second characteristics of the pulse sequence.

29. A computer usable medium including a program for decoding an information signal comprising:
computer program code for receiving a plurality of codewords from a source;
computer program code for determining a first number of non-zero pulse positions of a pulse sequence, based on a first variable length codeword;
computer program code for determining a length of a second variable length codeword, representing a second characteristic of the pulse sequence, based on the first variable length codeword; and
computer program code for decoding the pulse sequence based on the first and second codewords representing the first and second characteristics of the pulse sequence.

* * * * *